UNITED STATES PATENT OFFICE 2,258,142

IMMOBILIZING COMPOSITION FOR FRACTURES OF THE HUMAN BODY

Chester Orrin Padelford, Glen Ridge, N. J.

No Drawing. Application August 25, 1938,
Serial No. 226,836

3 Claims. (Cl. 128—91)

This invention relates to improved products and compositions for the use of physicians in immobilizing fractures of the human body.

Plaster of Paris has for many years been quite universally used for immobilizing fractures; but it is the common experience of physicians that the use of this material for the immobilization of fractured limbs results in discomfort and complaint from the patients, and is attended with disadvantages including the excessive weight of the immobilizing material. The amount of plaster of Paris required and its composition interferes with the taking of clear X-ray pictures of the fracture; and the difficulty in removing a plaster of Paris cast is well known to physicians. Nevertheless, plaster of Paris continues to be used for immobilizing fractures of the human body despite the objections and discomfort accompanying such use.

The present invention provides an improved immobilizing product for fractures of the human body which overcomes or minimizes to a large extent the objections and disadvantages of the ordinary plaster of Paris casts. Casts made of the new immobilizing material are easier to remove, harder, lighter in weight than plaster of Paris casts, due to the fact that less bandage is required, enable clear X-ray pictures of the fracture to be taken, enable the time for setting of the immobilizing material to be materially reduced and regulated, are more readily removed than ordinary plaster of Paris casts, and decrease the discomfort of the patient.

According to the present invention, an immobilizing product for fractures is produced by applying to a fabric base a specially compounded alpha gypsum of high purity comprising practically pure calcium sulphate hemi-hydrate obtainable by steam pressure calcination, made up of short thick crystals compounded with small amounts of chemicals which regulate and control the setting time of the alpha gypsum and enable it to give a rapid setting cast of regulated setting time.

The term alpha gypsum is used to identify the practically pure calcium sulphate hemihydrate obtained by steam pressure calcination and having the property when hydrated and set of permitting clear-cut X-ray pictures. The method of manufacturing the alpha gypsum and the properties thereof are more fully described in the patent to Randell and Dailey No. 1,901,051.

The fabric base used in producing the new immobilizing product may be gauze, muslin or like open-mesh fabric suitably sized or stiffened. To the fabric base is applied a layer of the compounded alpha gypsum, and the fabric base with the applied layer in position may be then rolled into bandage form similar to that of the ordinary plaster of Paris bandages. It is one advantage of the present invention that it enables the same or a similar fabric to be used as is used in ordinary plaster of Paris bandages, and the compounded alpha gypsum composition can be applied thereto in the same or a similar manner to that used in applying ordinary plaster of Paris; but the resulting improved immobilizing product has important advantages over the ordinary plaster of Paris bandages, such as those above referred to.

The alpha gypsum composition which is applied to the fabric base is made up for the most part of the alpha gypsum, that is of the practically pure calcium sulphate hemi-hydrate obtainable by steam pressure calcination, but the alpha gypsum is compounded or treated in whole or in part with a gum and with an alkaline reacting substance, and small amounts of chemicals are also compounded which enable the setting time of the composition to be regulated and controlled so that the composition, when wet and applied for the immobilization of fractures, will set in a regulated setting time of between five and fifteen minutes. The addition of a small amount of a gum, such as gum acacia, and of a small amount of an alkaline reacting substance results in giving a product with increased strength such that materially less of the alpha gypsum can be used in making satisfactory immobilizing casts. The addition of small amounts of sulphates enables a regulated setting time to be obtained and a mixture of potassium aluminum sulphate and magnesium sulphate is particularly valuable for this purpose.

White or gray alpha gypsum of the character refered to is marketed under the trade name "Hydrocal." A specially compounded alpha gypsum product is marketed under the trade name "Hydrostone." Hydrostone is alpha gypsum compounded with an aluminum silicate and particularly a silicate such as Portland cement. I have found that materially improved results can be obtained by using a mixture of these two alpha gypsum products than can be obtained with the use of either product alone, when the admixed products are compounded, e. g. with a small amount of potassium aluminum sulphate and magnesium sulphate.

The invention will be further illustrated by the following specific examples but it will be understood that the invention is not limited thereto:

*Example I.*—Alpha gypsum is compounded with a small amount of gum acacia and of Portland cement which acts as an alkali, and with a small amount of titanium dioxide which is advantageously added to the composition, and with a small amount of aluminum potassium sulphate and magnesium sulphate for example in the following proportions:

| | |
|---|---:|
| White or gray alpha gypsum (Hydrocal) | 90.00 |
| Gum acacia | 1.00 |
| Portland cement | 5.00 |
| Titanium dioxide | 2.50 |
| Potassium aluminum sulphate | 1.00 |
| Magnesium sulphate | 0.25 |
| Oxyquinoline sulphate | .06 |

The oxyquinoline sulphate used in a dilution of 1:2000 is compounded with the powdered aluminum sulphate and potassium sulphate and these are intimately and thoroughly mixed with the alpha gypsum, and the Portland cement and gum acacia are also thoroughly mixed to secure a substantially uniform intermixture. The resulting composition in powdered form is then spread on a fabric base and rolled into bandage form. The resulting bandage can be used for immobilizing fractures by wetting it by soaking in water and then immediately applying it to the fracture in much the same manner that an ordinary plaster of Paris bandage is applied, but with the use of far less material than is required in the case of an ordinary plaster of Paris bandage.

*Example II.*—Alpha gypsum (Hydrocal) and a specially compounded alpha gypsum composition (Hydrostone) are used in approximately equal proportions together with small amounts of potassium aluminum sulphate and magnesium sulphate. For example in the following proportions:

| | |
|---|---:|
| White or gray alpha gypsum (Hydrocal) | 53.00 |
| Compounded alpha gypsum (Hydrostone) | 45.00 |
| Potassium aluminum sulphate | 1.50 |
| Magnesium sulphate (dried) | .50 |
| Oxyquinoline sulphate (1:2000) | .06 |

In compounding these materials the oxyquinoline sulphate is mixed with the potassium aluminum sulphate and the magnesium sulphate and the resulting mixture is then intimately admixed with the alpha gypsum and compounded alpha gypsum to obtain a substantially uniform mixture. The resulting mixture is then applied to a fabric base and rolled into bandage form. When the roll is immersed in water and becomes wet it can then be unrolled and applied to the fractured limb and will set rapidly to form a cast with far less material than with the ordinary plaster of Paris bandage.

The new immobilizing compositions can readily be prepared with a setting time of five to seven minutes and have such an increased strength that a cast can be made with around one-half the amount of material required with the ordinary plaster of Paris bandages. As a result, a much lighter and thinner cast is obtained and a cast which is more easily removed. It is one of the advantages of the new immobilizing composition that when applied as a cast clear cut X-ray pictures can be obtained of the fracture with materially reduced penetration and exposure. The property of permitting clear-cut X-ray pictures is a property of the alpha gypsum employed, when hydrated and set, and which distinguishes it from ordinary plaster of Paris.

A small amount of titanium dioxide is advantageously incorporated in the composition. It enables a very white cast to be obtained and appears to lessen somewhat the tendency to brittleness in the final drying without objectionably affecting the other desirable properties of the product.

It will thus be seen that the present invention provides an improved immobilizing composition adapted for use in immobilizing fractures of the human body which enables casts to be obtained which are light in weight, which are of high tensile and compressive strength, and which can be much more readily removed than the ordinary plaster of Paris cast. Because of the greatly reduced weight there is corresponding decrease in discomfort of the patient; and the increased strength and setting time requires less time of the patient in the hospital before the cast is set so that the patient can leave, e. g. in the case of limb fractures. The improved composition moreover gives casts which are more permeable to X-ray, gives very clear X-ray pictures without shadows and with a materially reduced exposure time.

I claim:

1. An improved immobilizing composition comprising a fabric base having applied thereto a composition comprising a gypsum compounded with small amounts of a gum, an alkaline reacting substance and chemicals regulating the setting time, said composition being adapted when wet and applied to a fracture to set in a regulated period of from five to fifteen minutes to give a hard, light and thin cast, and said casts being sufficiently permeable to X-rays to permit the taking of clear-cut X-ray pictures.

2. An improved immobilizing composition comprising a fabric base having applied thereto a composition comprising alpha gypsum compounded with small amounts of chemicals and with a gum and an alkaline reacting substance, said composition adapted when wet and applied to a fracture to set in a regulated time of about five to seven minutes and giving a hard, light and thin cast, said cast being sufficiently permeable to X-rays to permit the taking of clear-cut X-ray pictures.

3. An improved immobilizing composition comprising a fabric base having applied thereto a composition comprising alpha gypsum compounded with a gum, an alkaline-reacting substance, and at least one chemical to regulate the time of setting, said composition being adapted when wet and aplied to a fracture to set in a regulated period of from five to seven minutes.

CHESTER ORRIN PADELFORD.